G. M. TEW.
VEHICLE SPRING.
APPLICATION FILED APR. 12, 1915.
1,182,115.
Patented May 9, 1916.
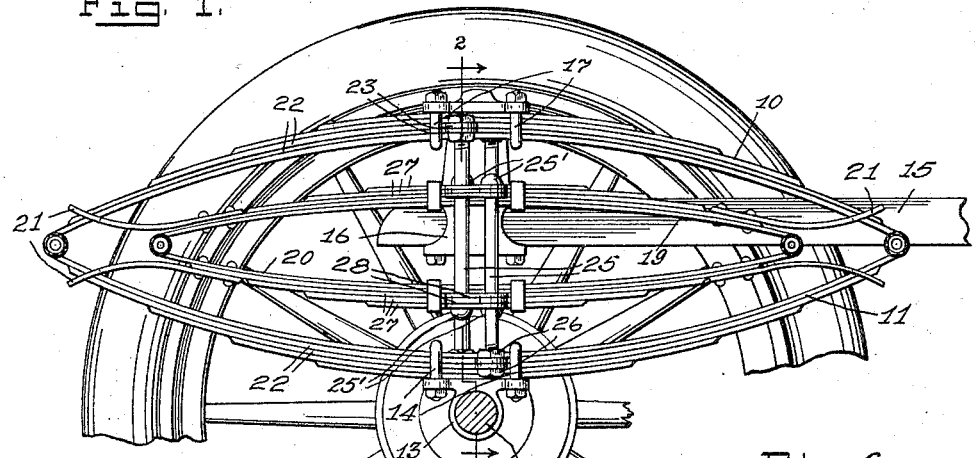
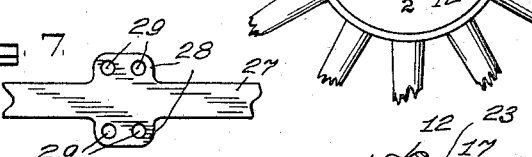
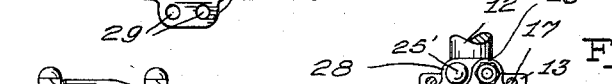
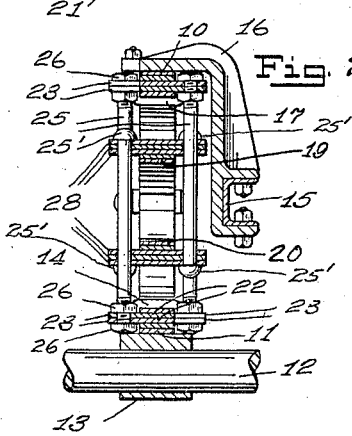
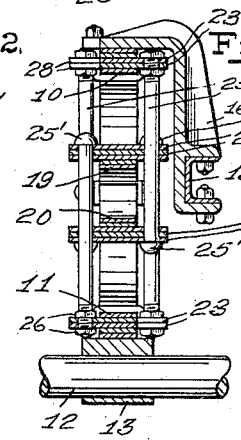
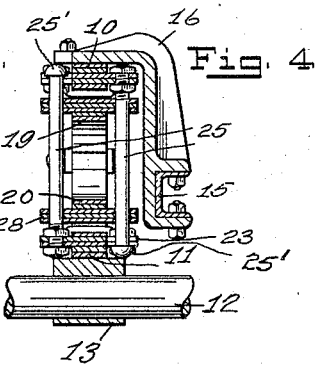
WITNESSES:
Charles L. Reynolds.
F. C. Matheny
INVENTOR:
George M. Tew
BY
Pierre Barnes
ATTORNEY
THE COLUMBIA PLANOGRAPH CO., WASHINGTON, D. C.

UNITED STATES PATENT OFFICE.

GEORGE M. TEW, OF KIRKLAND, WASHINGTON.

VEHICLE-SPRING.

1,182,115.  Specification of Letters Patent.  Patented May 9, 1916.

Application filed April 12, 1915. Serial No. 20,648.

*To all whom it may concern:*

Be it known that I, GEORGE M. TEW, a citizen of the United States, residing at Kirkland, in the county of King and State of Washington, have invented certain new and useful Improvements in Vehicle-Springs, of which the following is a specification.

This invention relates to vehicle springs and the object of my improvements is to provide a system of springs having shock-absorbing characteristics, and be of strong, simple and compact construction.

The invention consists in the novel construction, adaptation and combination of parts, as will be hereinafter described, illustrated in the accompanying drawings, and finally set forth in the appended claims.

In said drawings, Figure 1 is a view in side elevation of spring devices embodying my invention applied to a vehicle; Fig. 2 is a sectional view taken substantially on the line 2—2 of Fig. 1; Fig. 3 is a similar view showing the main spring members in expanded positions and the supplementary members under compression; Fig. 4 is a similar view showing the spring members all under compression; Fig. 5 is a plan view of the spring; and Figs. 6 and 7 are enlarged fragmentary plan views of the spring members.

Referring to the drawings, the numeral 10 indicates the top member and 11 indicates the bottom member of an elliptic spring of the type known as laminated carriage springs.

12 indicates a vehicle axle extending through a box 13 which is secured by U-bolts 14 to the lower spring member 11, as shown.

The upper spring member 10 is secured to the vehicle frame-bar 15 by a bracket connection 16 and U-bolts 17.

Disposed in a substantially symmetrical position within the aforesaid or main spring is a supplementary laminated plate elliptic spring having secured to its top and bottom members 19 and 20 curved extension plates 21. The outer ends of the latter are bifurcated to receive spring members 10 and 11 in proximity to their ends to prevent any relative lateral displacement of the springs.

The leaves 22 of the top and bottom spring members 10 and 11 of the main spring are provided at opposite sides with integral lugs or protuberances 23 arranged, as shown in Fig. 6, in diagonal relation with respect to longitudinal and transverse axes of the spring. Said lugs are each provided with an aperture 24 to accommodate the screw-threaded ends of headed bolts 25 and to which lugs the bolts are rigidly secured by nuts 26. The leaves 27 of the top and bottom members 19 and 20 of the supplementary spring, are provided with centrally disposed integral side lugs 28, see Fig. 7, each having spaced apertures 29 through which the bolts 25 are adapted to slide. The bolts 25 are arranged in pairs on each side of the spring and the extensions 23 are offset with respect to each other to provide clearance space for the head of the opposed bolt, as clearly illustrated in Figs. 5 and 4.

The operation of the invention is as follows: When a vehicle equipped with the present invention travels over a road having an uneven surface, the weight of the vehicle body and its load will, through its momentum, tend to ascend or descend with respect to the wheels and their axles. Ordinarily the main spring members 10 and 11 will primarily be compressed or flattened from their normal shapes (Figs. 1 and 2) to, perhaps, the extreme position shown in Fig. 4, where the bolt-heads $25^1$ encounter the axle box 13. Under such conditions the bolts 25 slide through the apertured lugs 28 of the supplementary spring members 19 and 20 without affecting the same. The power of the main spring will assert itself to regain its normal shape but in recoil or thrusting upward of the load, the momentum thereof tends to abnormally distend this spring but, in this instance, is obviated by the office of the supplementary spring which is brought into action by the heads $25^1$ of the bolts depending from the upper spring member 10 encountering the member 20, and the heads of the bolts which protrude upwardly from the lower spring member 11 encountering the member 19—that is to say, the bolts 25 secured to the upper and lower members of the main spring will respectively engage the lower and upper members of the supplementary spring. When this occurs, the supplementary spring yields and assumes, approximately, the position in which represented in Fig. 3, or until there is conserved in this spring sufficient power therein to overcome the force or momentum imparted thereto from the main spring, whereupon the two springs act in contrary directions until the opposing forces are overcome.

By my improvement reliable means are afforded to reduce the strains which the main spring has to endure to obviate danger of its breakage and without lessening its usefulness, and wherein the supplementary spring contributes to the efficiency of the main spring and serves as a shock-absorber.

What I claim, is—

1. In devices of the class described, a pair of laminated vehicle springs arranged one within the other, devices secured to plate elements of one spring and operable through guides provided on plate elements of the other spring whereby the compression of the outer spring is unaffected by the inclosed spring, while the ultimate expansion of said outer spring is opposed by the power of the inclosed spring.

2. In a device of the class described, a pair of vertically arranged springs each composed of two semi-elliptic laminated plate members, one of said springs being disposed within the other spring, and connections between the upper member of each spring with the lower member of the other spring and serving to maintain the springs in their relative aforesaid positions, said connections being inoperable with respect to the compressibility of the outer springs and operable to enable the inner spring to resist excessive expansibility of the outer spring.

3. In a device of the class described, a pair of associated springs each composed of two semi-elliptic members and arranged one within the other, and means disposed at opposite sides of and connected to both members of each of the springs so as to afford independent movements to the outer of said springs when the same is subjected to a compressing force, and serving to render the inner spring operative to resist a force which acts to distend the outer spring.

4. In a device of the class described, a pair of springs arranged one within the other, means rigidly connected to both of the members of one spring and movably connected to the members remote therefrom of the other spring whereby the outer spring is constrained in its movements against a force acting in one direction by the power of the inner spring but unconstrained with respect to a force acting in the opposite direction.

5. In a device of the class described, the combination with an elliptic vehicle spring, of a second elliptic spring disposed therein, and means connecting the upper and lower members respectively, of said second spring with the lower and upper members of the first-named spring whereby both members of said second spring will remain at rest when the other spring is compressed and will become operative during the excessive expansion of the first named spring.

6. In devices of the class described, the combination with a vehicle spring comprising two continuous semi-elliptic members, and a shock-absorbing spring comprising two continuous semi-elliptic members and disposed within said vehicle spring and in the same plane therewith, of means connecting the alternate members of both springs so that the shock absorbing spring will be rendered operative only when the vehicle spring is expanded from its normal shape.

7. In devices of the class described, the combination with an elliptic vehicle spring, of an elliptic shock-absorbing spring concentrically disposed with respect to said vehicle spring, means for retaining the springs in the aforesaid relative positions, apertured lugs provided on said shock-absorbing spring, and means connected with said vehicle spring and slidable in said lugs to effect the compression of said shock-absorbing spring in response to expansion of said vehicle spring.

8. In devices of the class described, the combination with an elliptic vehicle spring, of a similar shock-absorbing spring disposed between the members of said vehicle spring, bifurcated extension provided on the ends of said shock-absorbing spring and adapted to straddle the members of said vehicle spring, and bolts fixedly secured to the respective members of said vehicle spring and slidably associated with the members remote thereto of said shock-absorbing spring to effect the compression of the latter when said vehicle spring is expanded beyond a predetermined amount.

9. In devices of the class described, the combination with an elliptic vehicle spring having plate elements thereof provided with apertured side lugs, of an elliptic shock-absorbing spring having plate elements thereof formed with apertured side lugs, said shock-absorbing spring being disposed within the vehicle spring, and bolts secured to the lugs of said vehicle spring and slidable through the lugs of said shock absorbing spring in opposite directions, said bolts having heads adapted to engage the respective lugs of the shock-absorbing spring to effect the compression of the latter when said vehicle spring is expanded from its normal shape.

Signed at Seattle, Washington, this 20th day of March, 1915.

GEORGE M. TEW.

Witnesses:
PIERRE BARNES,
E. PETERSON.

Copies of this patent may be obtained for five cents each, by addressing the "Commissioner of Patents, Washington, D. C."